3,238,038
PRECIOUS METAL RECOVERY
Von D. Hunter, Toronto, Ontario, Canada, assignor to Zareba Corporation, Limited, Toronto, Ontario, Canada, a private company of Canada
No Drawing. Filed Aug. 7, 1964, Ser. No. 388,294
6 Claims. (Cl. 75—7)

This application relates to the recovery of precious metals, usually in an admixture, from certain geological formations, particularly to a method for treating the material of such deposits to recover precious metals readily and economically therefrom. The terms "precious metal" and "precious metals" as used herein include, and are limited to, one or more of the metals gold, silver, platinum, iridium, rhodium, ruthenium, osmium and palladium—all of these except gold and silver being, of course, known as the "platinum group" metals. This application is a continuation-in-part of application Serial No. 115,885, filed June 9, 1961, now U.S. Patent No. 3,150,960.

In the parent application it has been pointed out that one or more of the precious metals occur widely, but in very small proportions, in certain types of geological formations from which it is extremely difficult, if not impossible, to recover them using conventional procedure involving flotation, chlorination, cyaniding, roasting and the like. In particular it has been pointed out that many deposits containing one or more of the precious metals in variable small proportions are of the character referred to as "shales." When such shales or "shale type ores" are roasted, for example, to free them from certain constituents and to insure their complete oxidation, the precious metals become "fixed" in such a way as to render them practically unextractable by any of the conventional processes generally employed in recovering such metals. This is illustrated by the fact that very often it is impossible to detect these metals in such deposits by conventional fire assay procedures even though other analytical methods may show the presence of the metals in significant amounts. Although the cause of this difficulty is not understood fully, it is thought by some that the precious metals occur in a "colloidal" state dispersed in, or "entangled with," silica particles, presumably of sedimentary origin, and that they are often thus not accessible to the action of conventional agents because this colloidal state still persists in the solid body or is reestablished when it is attempted to bring the metals into solution by usual procedures.

In the parent application there is described and claimed a method for recovering precious metals in significant amounts from such shale type ores thereof which includes as a first step the treatment of the shale under suitable conditions with an aqueous acid solution comprising sulfate and halide anions to dissolve the metals. In subsequent steps the digested mixture is filtered and the metals precipitated as their sulfides from the filtrate. Eventually, the sulfides are separated by filtration and roasted to convert the precious metals to their oxides and the oxides are then reduced to the free metals in an atmosphere of hydrogen at a high temperature. Although the method of the parent application is of value as a general method applicable to the recovery of precious metals present in small amounts in shale type ores from which it has not heretofore been possible to recover them economically, the method suffers, in some instances, from certain undesirable characteristics which, if they could be avoided, would lead to better economy and higher efficiency of recovery. In particular, it appears that a considerable proportion of the precious metals in the shale remains in the residue from the acid extraction and is not dissolved by the aqueous acid solution.

In the parent application it is pointed out that some of the shale type ores in which certain of the precious metals are found in small amounts occur in the vicinity of the Black Hills of South Dakota and adjacent regions. These deposits, which occur in the geological formations known as the Pierre and Granerous formations, sometimes referred to collectively simply as the Pierre formation, are specially high in their content of organic matter, generally about 6% by weight. Other representative constituents and representative proportions thereof in the shale are silica about 64%, alumina about 14%, ferrous iron about 1% and ferric iron about 4%. In addition, these deposits contain varying small amounts, usually from traces to much less than 1%, of many other elements. It is thought that, because of their high content of organic matter, these shales may have resulted by the escape of a considerable proportion of, or most of, the oils and bituminous material from former oil shales. Since the organic material in these shales, and in similar shales found elsewhere, appears to be largely bituminous in character, they are often referred to as "bituminous shales" and will be so referred to herein.

In applying the method of the parent application to these bituminous shales, considerable difficulty has been experienced in the treatment of the shale with an acid mixture and subsequent precipitation of the precious metals as their sulfides. This difficulty appears to be related to the apparent colloidal nature of the precious metals and of, at least, a part of the silica in the shale with the result that interfering amounts of silica, and of other impurities, are carried along through the process to the point where they are precipitated along with the sulfides of the precious metals. It is emphasized that this explanation is largely conjectural and it may be that there are other reasons why the precious metal sulfides are not obtained in a more pure state using the method of the parent invention. At any rate, it is recognized that any modification of the method which would give more favorable results would be of great value.

It has now been found that treating the finely ground bituminous shales referred to with an aqueous alkaline solution under controlled conditions prior to treatment with an aqueous acid solution containing sulfate, nitrate and chloride anions to dissolve the precious metals, coupled with certain modifications in subsequent steps of the process, leads to superior results with these particular bituminous shales as compared to those obtained using the process of the parent application. Such treatment with an alkaline solution is for convenience, herein referred to as an "alkaline pretreatment" or, sometimes, simply as a "pretreatment" of the bituminous shale. These matters will be referred to in more detail in the following paragraphs.

The pretreating of the shale can, for convenience in description, be referred to as "initial" and "final" pretreating, it being understood, however, that this division is merely for the sake of convenience and is not critical. The grinding and initial pretreating of the bituminous shales can be carried out simultaneously or separately. When carried out separately it is convenient to grind the shale, e.g. in a ball or pebble mill, first, and then to pretreat the ground material. For convenience, the process will be described under a series of arbitrarily chosen headings.

Dry grinding

Dry grinding is preferably carried out after drying the shale at a low temperature. The drying temperature should not exceed about 125 degrees C., preferably not more than about 115 degrees C. Higher drying temperatures cause certain changes in the composition or physical state of the shale which are not understood, but which serve to "fix" or "lock" the precious metals in the shale in a state such that their subsequent recovery is interfered with seriously. In particular, it is highly undesirable to heat the shale to burn off organic matter since, if this is done, little or no precious metals can be recovered from the residual shale. Drying at the temperature indicated should be continued until the free water content of the shale is low enough, e.g. less than 2 to 3 percent, to permit easy grinding of the dry shale in the particular apparatus employed. It is preferable that the shale be ground fine enough to enable roughly 90 percent, or more, of it to pass a 300 mesh screen. In general, the finer the grind, the better.

Wet grinding and initial pretreatment

The shale can also be wet ground, either with or without being dried previously, with the pretreating solution to effect both grinding and initial pretreatment. This is accomplished by mixing the broken up shale with the pretreating solution and grinding the wet mixture until the desired degree of fineness, preferably comparable to that attained by dry grinding, is obtained.

The pretreating solution comprises an aqueous solution of an alkaline substance selected from the group consisting of the water-soluble hydroxides, carbonates, bicarbonates, and hypochlorites of the alkali metals, the alkaline earth metals and ammonium, and mixtures thereof. Alkaline substances which have been employed with success include ammonium carbonate, sodium carbonate, potassium carbonate, ammonium hydroxide, sodium hydroxide, potassium hydroxide, lithium hydroxide, lithium carbonate, calcium hydroxide, sodium bicarbonate, potassium bicarbonate, calcium hypochlorite, sodium hypochlorite, lithium hypochlorite and mixtures thereof. In the interest of economy and effectiveness, sodium hydroxide is generally used and the invention will be described with particular reference thereto, it being understood, of course that when using another alkaline substance it may be advantageous to vary the treating conditions somewhat within the ranges given from the optimum condition with respect to the use of sodium hydroxide.

The amount of pretreating solution with which the shale is mixed for grinding depends to some extent on the particular type of mill employed, it being only necessary that the proportions used be such that rapid grinding occurs. When employing a small pebble mill, for example, it has been found that from 1.5 to 3.0 parts by weight of pretreating solution can be employed with satisfaction for each part of shale. If less than 1.5 parts of solution is employed, the mixture is often insufficiently fluid to grind readily. If more than about 3 parts of solution is employed, the mixture often forms a slurry which is too thin to promote fine grinding. These proportions are not, otherwise, critical.

The proportion of alkaline substance in the pretreating solution is of considerable importance, although it can be varied over a relatively wide range. Generally speaking, when using sodium hydroxide it is advisable to use a solution containing from about 1.5 to about 15.0 percent by weight of the hydroxide. When less than about a 1.5 percent concentrated solution is employed, the desired "opening up" effect on the shale, the nature of which is not clear, is not as marked as is desirable and the final yield of recovered precious metals is accordingly lower. On the other hand, when more than about a 15.0 percent concentrated solution is employed, unduly large amount of silicon compounds are dissolved, and these interfere in the subsequent procedural steps and generally appear as impurities in the final recovered precious metals and actually interfere with the recovery thereof. In practice, it is often preferable to use an aqueous solution containing from about 1.5 to about 5 percent by weight of sodium hydroxide. As will be noted, it is often convenient for manipulative purposes to effect the initial pretreatment with a solution of one concentration and to then dilute the mixture with water prior to the final pretreatment. The amount of silicon compounds dissolved in the alkaline pretreating solution varies directly with the temperature and concentration of the pretreating solution, and to some extent with the time of pretreatment, and for this reason a careful adjustment of these factors with respect to one another is advisable.

Grinding of the bituminous shale with the pretreating solution is carried out conveniently at ordinary or slightly elevated temperatures. It is convenient, and insofar as is known it may be desirable, that temperatures near the boiling temperature of the pretreating solution be avoided during the initial stages of the pretreatment.

Initial pretreatment of dry ground shale

Shale which has been ground dry can be mixed with the pretreating solution and the mixture stirred at ordinary or somewhat elevated temperature, e.g. for from 2 to 4 hours, to effect the initial pretreatment. The mixture is then conveniently diluted with water and further stirred and heated to effect the final pretreatment which is discussed in the following section.

Final pretreatment

Following the wet grinding operation, or the initial pretreatment of the dry ground shale, as the case may be, the diluted slurry of ground shale and alkaline solution is heated at a temperature above about 50 degrees C., preferably at 80 to 90 degrees C., and stirred to complete the pretreating operation. Although this heating operation can be carried out in the mill if the mill is adapted to having its contents heated, it is generally more convenient to remove the slurry from the mill first. In the case of a pebble mill it is also advantageous to separate the pebbles to eliminate any possibility of action of the hot alkaline solution on the pebbles and any consequent further contamination of the mixture with dissolved silica, and the like. The slurry can be washed from the mill with an amount of water insufficient to dilute the sodium hydroxide to a concentration less than about 0.5 percent. This precaution applies as well to the dilution of the slurry of dry ground shale and alkaline solution following the initial pretreatment.

Heating of the stirred mixture is continued for approximately one hour, although the time is not highly critical, and the mixture then cooled e.g. to 50 degrees C., or below, and the supernatant liquid is separated from the insoluble residue e.g. by filtration or preferably, by decantation and washing with water until the washings are essentially colorless. The separated liquor and washings are discarded.

It often occurs that a part of the insoluble material settles extremely slowly, and it is convenient, especially when the separation is to be effected by decantation, to flocculate the fine material with a suitable flocculating agent, a number of which are available commercially.

Extraction

The extraction of the precious metals from the pretreated shale is carried out by stirring the residue from the pretreatment, usually without the addition of more water, making the mixture strongly acid while ensuring the presence of sulfate, nitrate and chloride anions in solution therein and then heating and stirring the mixture for several hours. In the event it seems advisable to add additional water to the wet slurry to promote stirring, the proportion of water added is not critical except that it should be kept as low as convenient to conserve acid. The slurry is stirred and acidified. Ordinarily, the acidifying agent is a combination of sulfuric, hydrochloric and nitric acids. These can be added to the slurry in any convenient manner and the acidified mixture then heated. It has been found advantageous, however, to first dilute the sulfuric acid somewhat by stirring it into a relatively small proportion of its volume, e.g. about 25 percent, of water and to add this mixture to the slurry. After stirring and heating somewhat, the hydrochloric and nitric acids are added, either separately or after mixing. The mixture is then stirred and heated, preferably at a temperature of from about 60 degrees to about 100 degrees C., for several hours, preferably for from 6 to 8 hours.

Inasmuch as it is highly desirable, in order to promote the dissolving of the precious metals in the acid mixture, that they be in their highest state of oxidation, it is desirable to maintain vigorous oxidizing condition in the mixture during the heating and stirring. Although the nitric acid employed is a vigorous oxidizing agent, it has been found convenient in most instances to add a supplementary oxidizing agent, preferably in small amounts at intervals during the heating period. A number of oxidizing agents can be employed including sodium chlorate, potassium chlorate, calcium hypochlorite, and the like. One particularly advantageous oxidizing agent is ammonium persulfate.

Although the concentration of acid in the extraction mixture can be varied over fairly wide limits, it has been found advantageous to utilize from about 15 to about 60 parts by weight of sulfuric acid for each 100 parts of water in the slurry. Some consideration should also be given to the ratios of the amounts of sulfuric, hydrochloric and nitric acids to one another. Generally speaking, it is desirable that from about 0.9 to about 2.1 parts by weight of concentrated aqueous hydrochloric acid, e.g. 31% hydrochloric acid, and from about 0.15 to about 0.35 part of commercial aqueous nitric acid, e.g. 70 percent nitric acid, be employed for each part of sulfuric acid in the mixture. It is pointed out, however, that these proportions with respect to one another of water and of acid can not readily be defined precisely since they depend on a number of factors including the precise nature of the shale being treated, the effectiveness of the pretreatment step in rendering the precious metals susceptible to the extraction, and others. In any event, however, the extracting liquor must be highly acidic and must, for best results, be of a strongly oxidizing nature.

It has been noted previously that the extracting liquor must comprise sulfate, nitrate and chloride anions. When sulfuric, nitric and hydrochloric acids are employed, these anions are furnished automatically. It is, however, entirely feasible to employ a soluble chloride, such as sodium chloride, lithium chloride or ammonium chloride in place of the hydrochloric acid and then to use a sufficient excess of sulfuric acid to react therewith to generate hydrochloric acid. The same may be said with respect to the use of a soluble nitrate, such as sodium nitrate, in place of the nitric acid. Generally speaking, however, the use of the free acids is preferred.

Following the heating and stirring of the extraction mixture it is filtered through an acid resistant filter and the residue on the filter washed well with water which has been acidulated, preferably with sulfuric, hydrochloric and nitric acids in the proportions used in the extraction. The residue is finally washed with plain water until the washings are colorless, the filtrate and washings being combined and the washed residue being discarded. In case the combined filtrate and washings are not prefectly clear and free of suspended matter, they should be refiltered through a fine filter until perfectly clear.

*Precipitation of metal sulfides*

The precious metals are precipitated from the clear solution obtained from the extraction step as their sulfides. Unless care is taken is carrying out this step, the metal sulfides will form in what is apparently a colloidal or near-colloidal state in which they are practically impossible to recover from the solution by filtration. Also, due to the unavoidable presence of what appear to be silica-containing compounds in the prefectly clear solution, care must be exercised to avoid as much as possible any precipitation of these substances which would serve to hinder the subsequent filtration to recover the sulfides and would constitute a major contaminant of the recovered sulfides.

To avoid these and other difficulties it has been found that a preferred procedure involves saturating the clear solution from the acid extraction step at or slightly above ordinary room temperature, e.g. at a temperature of from about 20 degrees to about 40 degrees C., with hydrogen sulfide, then heating the solution and causing it to be successively alkaline and then acid in character while still saturated with hydrogen sulfide. It has also been found convenient, but not essential, to generate the hydrogen sulfide in the solution by adding a water-soluble sulfide, preferably sodium sulfide, either as a solid or as an aqueous solution, rather than to generate hydrogen sulfide outside the reaction mixture and then to add it to the mixture.

To this end an alkali, preferably ammonia, is added to the acid solution until the pH has been raised to approximately 4, and sufficient sodium sulfide is added to cause the evolution of at least a small amount of gaseous hydrogen sulfide. The solution is stirred until all visible reaction has ceased and the addition of ammonia is continued until the solution is at pH 7.5 to pH 9. Sufficient additional sodium sulfide is then added to convert the entire precipitate in the mixture to an entirely black color. The mixture of solution and suspended sulfide is then heated with stirring to near its boiling temperature and stirred at this temperature for a short time, e.g. for from ½ to 1 hour. The mixture should at this point be free of oxidizing substances and should give no reaction with starch iodide paper. If a positive test is obtained, additional sodium sulfide is added until the test is negative.

A mineral acid, such as sulfuric or hydrochloric acid, is then added slowly to the hot mixture with continued stirring and with the frequent addition of sodium sulfide to insure the continued saturation of the solution with hydrogen sulfide. Addition of the mineral acid is continued until the mixture is about pH 1.0 or below. After stirring for a short time and checking to be sure that the mixture is still at pH 1.0 or below, a small amount of a concentrated solution of mercuric chloride is stirred in followed by a small amount of ammonium chloride. The mercuric sulfide which is precipitated acts in the presence of ammonium chloride to coagulate the precious metal sulfides and causes them to settle readily. It is not feasible to define precisely the amount of mercuric chloride which should be added since this depends upon the amount of precious metal sulfides in the mixture, and upon other factors. However, the sufficiency of the amount of mercuric chloride added can be judged visually without difficulty. Upon further boiling the solution for a short time the precipitated metal sulfides are present as small coagulated masses in the greenish or milky solution. In the event hydrogen sulfide is employed in place of sodium sulfide, the same procedure is followed while passing hydrogen sulfide continuously into the mixture The hot solution is then filtered through a retentive filter, e.g. through filter paper, and the residue is washed thoroughly first with dilute hydrochloric acid then with water followed by 20 percent aqueous ammonia and finally with distilled water. The filtrate and washings are discarded. The residue is saved. The filter paper is dried, the organic matter is burned off, and the ash is added to the residue.

Dissolution of metal sulfides

The residue of metal sulfides and filter ash is covered with aqua regia to which a few drops of hydrofluoric acid has been added. The mixture is allowed to stand at room temperature for from 4 to 6 hours and the mixture is then heated short of boiling for approximately 1 hour. Crystals of ammonium persulfate are added in small portions intermittently and the mixture stirred gently until brown fumes of nitrogen oxides are no longer evolved. The volume of the solution is preferably maintained relatively constant by the intermittent addition of dilute (1:1) hydrochloric acid. The mixture is then cooled and diluted with about 4 times its volume of water and filtered. The residue is discarded.

Refining of mixed metal compounds

It has been observed that by repeating the precipitation and dissolution of the metal sulfides as described in the foregoing sections a considerable reduction in the amount of impurities associated with the metals can be effected. Although this procedure is in many instances advantageous, it is by no means essential. It is generally, however, advisable to carry out this refining step when the residue from the filtration in the dissolution step appears to be excessive. The precipitation and dissolution procedures employed should be those described in the foregoing sections. The procedure can be repeated as many times as seems desirable. In the last repetition of this procedure this dissolution of the metal sulfides is not carried out and the metal sulfides and filter ash are converted to their oxides in the way described in the following section.

Conversion of metals to oxides

The residue of metal sulfides and filter ash is ignited carefully, e.g. in a closed electric furnace, at a temperature above about 500 degrees C., preferably at from about 700 to about 775 degrees C. until essentially all of the metals present have been converted to their oxides. This usually requires heating for from 1 to 2 hours, but the actual time is, of course, dependent upon the actual temperature and the ease of access of air to all parts of the mass. The oxides are then allowed to cool. It appears that in certain instances not all of the palladium sulfide is converted to palladium oxide. However, this is not important as will be mentioned in the next section.

Reduction of metal oxides

The metal oxides obtained by the procedure of the previous section are next reduced by hydrogen to an aggregate of the free metals. This is effected by heating the oxides at from about 800 to about 1200 degrees C., usually at about 900 degrees C., in an atmosphere of hydrogen until reduction is complete, e.g. for approximately 1 hour. Particular care should be exercised to eliminate all possibility of certain of the metals being reoxidized by contact with air while still hot. For this reason the reduced product is cooled while still in a hydrogen atmosphere to below 200 degrees C., preferably to below 100 degrees C. It has been found that any palladium sulfide remaining after roasting the mixed metal sulfides is reduced to palladium metal during the hydrogen reduction step.

Refining of recovered metals

The mixture of precious metals resulting from the reduction step thus described is generally contaminated with more or less silica and other materials. If desired, the metal mixture can be purified to a considerable extent by treating it at room temperature with an excess of concentrated hydrochloric acid which has been diluted with one third of its volume of water and which is saturated with ammonium chloride. The treatment is carried on for several hours and effectively dissolves some of the impurities, the nature of which has not been determined. The mixture is eventually diluted with approximately an equal volume of distilled water and heated to boiling after which it is cooled and filtered on a fine filter. The residue on the filter is washed thoroughly with hot distilled water and then with dilute ammonium hydroxide solution and again with hot distilled water. It is finally washed thoroughly with warm 5 percent aqueous nitric acid and then with hot distilled water and dried. The filtrate and washings are discarded. The product on the filter is a mixture of the precious metals occuring in the bituminous shale treated and generally contains less than about 5 percent by weight of impurities consisting principally of silica and traces of base metals.

Certain advantages of the invention are apparent from the following example which is given by way of illustration only and is not to be construed as limiting.

EXAMPLE

Dry grinding

A quantity of bituminous shale taken from the Pierre and Granerous formation of South Dakota was granulated to convenient size and dried at about 110 degrees C. to approximate constant weight. The particular quantity dried lost about 6 percent of its weight during drying. The dried shale was ground in a suitable mill until more than 90 percent of the ground material passes a 300 mesh screen.

Wet grinding and initial pretreatment

A suitable pebble mill was charged with 600 grams of undried granular bituminous shale taken from the Pierre and Granerous formations of South Dakota, 31 grams of commercial flake sodium hydroxide, 1500 milliliters of water and a suitable quantity of various sized pebbles. The mill was closed and rotated for three hours at moderate speed and at ordinary room temperature. The mill was then opened and the contents washed out with 3500 milliliters of warm water, the pebbles being separated from the slurry of alkaline solution and finely ground shale.

Initial pretreatment of dry ground shale

Six hundred grams of the dry ground bituminous shale prepared according to the first section of the example was mixed with 1500 milliliters of water and 31 grams of commercial flake sodium hydroxide. The mixture was stirred for about 3 hours at about 30 degrees C. The mixture was then diluted with about 3500 milliliters of water. The slurry thus prepared was used in carrying out a procedure entirely similar to that described in the following sections of the Example with entirely similar results.

Final pretreatment

The alkaline slurry from the wet grinding and in initial pretreatment step was stirred to prevent settling and heated gradually to 80 to 90 degrees C. Stirring was continued for about one hour at this temperature. Stirring was continued without heating until the slurry had cooled to about 50 degrees C. About 0.5 gram of a commercial flocculating agent (Superfloc #16, the composition of which is not known with certainty but which is available from American Cyanamid Corporation) was dissolved in 250 milliliters of water and the solution added to the mixture. The mixture was stirred thoroughly and gently and then allowed to stand until the suspended solids had settled. The clear, dark supernatant liquid was then drawn off and discarded.

The settled solid material was stirred for about one hour with 3500 milliliters of warm water, a second similar portion of a solution of the flocculating agent was added. The mixture was allowed to settle, and the clear liquid decanted as before. This washing procedure was repeated a second and a third time, the last wash liquor being only slightly colored and only slightly alkaline. The wash liquors were discarded.

Extraction

The washed solid material, which contained about 1200 milliliters of water, was stirred vigorously to break up the floc and, while stirring gently, slightly diluted sulfuric acid was added until the mixture remained at about pH 6 upon continued stirring. About 100 milliliters of concentrated sulfuric acid which had been stirred into about 25 percent of its volume of water was then added slowly with stirring. Stirring of the mixture was continued for about one hour during which period its temperature was raised gradually to about 90 degrees C.

The mixture was further acidified with about 450 milliliters of commercial muriatic acid and about 100 milliliters of commercial grade nitric acid. Five grams of powdered ammonium persulfate was also added. The acid mixture was stirred at about 90 degrees for about 7 hours during which time two additional 5 gram portions of ammonium persulfate were added, the last portion bieng added about one hour before the end of the period.

Stirring was then discontinued and the hot mixture was filtered through a course filter to permit rapid flow of the liquid and retention of most of the solid material. The residue was washed with several portions of water which had been acidulated with sulfuric, hydrochloric and nitric acids in the approximate proportions given above. The residue was washed with water until the wash water was free of color. The residue was discarded and the filtrate and washings combined. This solution was then filtered through a fine filter to remove all suspended particles and leave a clear sparkling solution.

Precipitation and filtration of metal sulfides

The warm filtrate from the foregoing procedure was stirred slowly and ammonium hydroxide was added gradually until the mixture was at about pH 4. About 10 grams of solid sodium sulfide and about 15 grams of ammonium carbonate were added and stirring was continued for a few minutes. Addition of ammonium hydroxide was then continued until the mixture was at about pH 8. About 10 grams of solid sodium sulfide was then added after which all of the precipitate in the mixture was entirely black in color. The mixture was then stirred slowly and heated gradually to near its boiling temperature. While still stirring at almost the boiling temperature, hydrochloric acid was added slowly until the mixture was at about pH 1.5. During the addition of the hydrochloric acid, small portions of solid sodium sulfide were added from time to time to insure a continued saturation of the mixture with hydrogen sulfide. Approximately 40 grams of sodium sulfide was added during this period.

After the mixture had been stirred at pH 1.5 for several minutes, a concentrated aqueous solution of about one gram of mercuric chloride was added followed by about 10 grams of crystalline ammonium chloride. Following the addition of the ammonium chloride the mixture was boiled for about ½ hour to coagulate the precipitate of black metal sulfides. The mixture was allowed to cool during which time the sulfides settled readily. The mixture was filtered through a fine filter paper and the greenish filtrate was discarded. The residue was washed first with very dilute hydrochloric acid, then with hot distilled water, and then with dilute (1:20) ammonium hydroxide until the filtrate was entirely colorless. The precipitate of metal sulfides was finally washed thoroughly with hot distilled water. All of the filtrates were discarded.

Dissolution of metal sulfides

The residue on the filter from the foregoing procedures was transferred carefully to a small beaker and retained. The filter paper was folded up, dried and ignited and the ignited residue added to the residue in the beaker. The combined residues in the beaker were mixed with about 40 milliliters of aqua regia to which a few drops of hydrofluoric acid had been added. The beaker was covered with a watch glass and allowed to stand at room temperature for about 6 hours. The mixture was then warmed in the uncovered beaker, without boiling, for about on hour, a few milligrams of ammonium persulfate crystals being added with gentle stirring. The mixture was then heated at about 80 degrees C. with frequent additions of a few milligram portions of ammonium persulfate and gentle stirring until brown fumes of nitrogen oxides were no longer evolved. The volume of the mixture was kept approximately constant during heating by the intermittent addition of dilute hydrochloric acid (1:1). After cooling, the mixture was diluted with about 4 times its volume of distilled water and filtered. The residue was washed carefully and discarded, the filtrates and washings being combined.

Refining of mixed metal compounds

The acid filtrate from the foregoing procedure was subjected to the precipitation, filtration and dissolution steps described previously, this procedure being repeated twice as described above. The final filtrate obtained after removal of nitrogen oxide fumes, dilution with 4 volumes of distilled water and filtering, was again treated to precipitate the metal sulfides which were recovered by filtering and washing as before.

Conversion of metals to oxides

The precipitated sulfides and the filter paper on which they had been collected were dried at 105 degrees C. and ignited carefully to burn off all organic matter and carbon and essentially all of the sulfur. The ignited residue was then heated in an electric furnace at about 750 degrees C. for one hour to be sure that all of the metals present in the residue were, with the possible exception of palladium, converted to their oxides.

Reduction of metal oxides

The metal oxides were then reduced to the free metals by heating them for one hour at about 920 degrees C. in a hydrogen atmosphere, the free metals thus formed being cooled in an atmosphere of hydrogen to a temperature below 200 degrees C. before exposure to the air to avoid reoxidation. Any palladium sulfide which may have been in the metal oxide mixture was reduced to palladium metal.

Refining of recovered metals

The reduced metals were treated for several hours at room temperature with about 100 milliliters of a mixture of 3 parts of concentrated hydrochloric acid and one part of water which was saturated with ammonium chloride. The mixture was then diluted with an equal volume of distilled water and heated to boiling. The hot solution was cooled to about room temperature and filtered on a tared fine glass filtering crucible. The residue in the crucible was washed thoroughly with hot distilled water, then with a 1:5 ammonium hydroxide solution and again with hot distilled water. It was finally washed thoroughly with warm 5 percent aqueous nitric acid, then with hot distilled water and dried in the crucible. The product thus obtained weighed 40 milligrams and consisted of a mixture of precious metals containing about 2 percent by weight of impurities, principally silica and traces of base metals.

I claim:

1. In a method for recovering at least one metal selected from the group consisting of gold, silver, platinum, iridium, rhodium, ruthenium, osmium and palladium from a bituminous shale containing said metal together with silica, said metal being entangled with said silica, the steps including:

digesting the shale with an aqueous solution of an alkaline substance selected from the group consisting of ammonium carbonate, sodium carbonate, potassium carbonate, ammonium hydroxide, sodium hydroxide, potassium hydroxide, lithium hydroxide, lithium carbonate, calcium hydroxide, sodium bicarbonate, potassium bicarbonate, calcium hypochlorite, sodium hypochlorite, lithium hypochlorite and mixtures thereof, to increase the susceptibility of said metal to dissolution in an aqueous acid solution containing sulfate, nitrate and chloride anions;

separating an insoluble residue from the alkaline digestion mixture;

digesting the residue from the alkaline digestion with an aqueous acid solution containing sulfate, nitrate and chloride anions;

separating a clear aqueous solution containing said metal from the acid digestion mixture;

contacting the clear solution with sulfide anions while making the solution first alkaline and then acid to precipitate said metal as its sulfide;

separating the precipitated metal sulfide from the acid solution;

roasting the separated metal sulfide in an oxidizing atmosphere at a temperature above about 500 degrees C. to convert the metal essentially to its oxide;

and reducing the roasted product in an hydrogen atmosphere at a temperature between about 800 degrees C. and about 1200 degrees C. to reduce the metal compound to the free metal.

2. The method of claim 1 wherein the aqueous alkaline solution is an aqueous solution containing from about 1.5 to about 15.0 percent of sodium hydroxide and the alkaline digestion step is carried out first at a temperature between about 20 degrees and about 40 degrees C. and subsequently, after dilution with water at a temperature above about 50 degrees C.

3. The method of claim 1 wherein the pH of the solution from which the said metal is precipitated as its sulfide is, while being contacted with sulfide anions, first increased to about pH 8.0 by adding ammonia and is subsequently reduced to about pH 1.0 by the addition of an acid.

4. The method of claim 1 in which the sulfide anion for precipitation of the metal as its sulfide is furnished by the addition to the solution of a water-soluble sulfide in amount and at intervals sufficient to insure the acid solution being at all times saturated with hydrogen sulfide.

5. The method of claim 1 wherein the precipitated metal sulfide is purified prior to roasting by dissolving it and in aqua regia, diluting the solution with water and filtering to clarify it, contacting the clear solution with sulfide anions while making the solution first alkaline and then acid to reprecipitate the metal as its sulfide and separating the reprecitated metal sulfide from the solution.

6. The method of claim 1 wherein the free metal after its production by reduction with hydrogen is cooled to at least about 200 degrees C. in an oxygen-free atmosphere.

References Cited by the Examiner

UNITED STATES PATENTS 3,150,960    9/1964    Hunter _____ 75—118

BENJAMIN HENKIN, *Primary Examiner.*